(12) United States Patent
Moon

(10) Patent No.: US 12,676,357 B2
(45) Date of Patent: Jul. 7, 2026

(54) BI-MATERIAL COOLING VALVES

(71) Applicant: POLESTAR PERFORMANCE AB,
Gothenburg (SE)

(72) Inventor: Jongseok Moon, Gothenburg (SE)

(73) Assignee: POLESTAR PERFORMANCE AB,
Gothenburg (SE)

( * ) Notice: Subject to any disclaimer, the term of this
patent is extended or adjusted under 35
U.S.C. 154(b) by 791 days.

(21) Appl. No.: 17/959,876

(22) Filed: Oct. 4, 2022

(65) Prior Publication Data

US 2024/0113354 A1 Apr. 4, 2024

(51) Int. Cl.
| | |
|---|---|
| *H01M 10/637* | (2014.01) |
| *B60L 58/26* | (2019.01) |
| *F16K 31/00* | (2006.01) |
| *H01M 10/613* | (2014.01) |
| *H01M 10/625* | (2014.01) |
| *H01M 10/65* | (2014.01) |
| *H01M 10/6556* | (2014.01) |
| *H01M 10/6568* | (2014.01) |

(52) U.S. Cl.
CPC .......... *H01M 10/637* (2015.04); *B60L 58/26*
(2019.02); *H01M 10/613* (2015.04); *H01M
10/625* (2015.04); *H01M 10/65* (2015.04);
*H01M 10/6556* (2015.04); *H01M 10/6568*
(2015.04); *F16K 31/002* (2013.01); *H01M
2200/101* (2013.01); *H01M 2220/20* (2013.01)

(58) Field of Classification Search
CPC .... H01M 10/637; H01M 10/60; H01M 10/63;
H01M 10/6568; H01M 10/6567; H01M
10/6556; H01M 10/65; H01M 10/625;
H01M 2220/20; H01M 10/613; H01M
2200/101; F16K 31/002; F16K 1/00;
F16K 1/38; Y02E 60/10; B60L 58/26
See application file for complete search history.

(56) References Cited

U.S. PATENT DOCUMENTS 5,691,073 A * 11/1997 Vu ...................... H01M 50/578
429/57
11,387,505 B2 7/2022 Hickey et al.
(Continued)

OTHER PUBLICATIONS

Application No. PCT/EP2023/077125 , International Search Report
and Written Opinion, Mailed On Jan. 4, 2024, 14 pages.

*Primary Examiner* — Gregg Cantelmo
*Assistant Examiner* — Julia Marie Fehr
(74) *Attorney, Agent, or Firm* — Kilpatrick Townsend &
Stockton LLP

(57) ABSTRACT

A electric vehicle battery thermal regulation system config-
ured to prioritize a flow of cooling fluid past at least one of
a battery cell experiencing a thermal event, including a
plurality of conduits through which a flow of thermal
regulation fluid can flow, portions of the thermal regulation
system positioned in close proximity to the at least one of a
plurality of battery cells to provide cooling to said plurality
of battery cells, wherein the thermal regulation system
includes one or more bi-material valves configured to at
least one of open or close in response to a change in
temperature of the thermal regulation fluid, thereby rerout-
ing a flow of the thermal regulation fluid through the
plurality of conduits to prioritize cooling to one or more
battery cells experiencing a thermal event.

9 Claims, 4 Drawing Sheets

(56)                    References Cited

U.S. PATENT DOCUMENTS

| | | | |
|---|---|---|---|
| 2006/0121336 A1* | 6/2006 | Yoon .................. | H01M 50/325 |
| | | | 429/61 |
| 2019/0077275 A1* | 3/2019 | Capati .................. | H01M 10/63 |
| 2020/0176741 A1* | 6/2020 | Kang .................. | H01M 50/202 |
| 2021/0359371 A1 | 11/2021 | Dunn | |
| 2022/0102780 A1* | 3/2022 | Hickey .................. | B60L 50/64 |
| 2022/0281353 A1 | 9/2022 | Cheadle et al. | |

* cited by examiner

BI-MATERIAL COOLING VALVES

TECHNICAL FIELD

The present disclosure relates generally to battery conditioning of an electric vehicle, and more particularly to a valve system and method of providing rapid cooling to the battery pack of an electric vehicle in the event of a thermal runaway.

BACKGROUND

Electric vehicles are becoming increasingly popular as consumers look to decrease their environmental impact and improve air quality. Instead of a traditional internal combustion engine, electric vehicles include one or more motors, powered by a rechargeable battery pack. A common battery pack is made up of one or more battery modules, each module containing a plurality of battery cells, which act as galvanic cells when being discharged by converting chemical energy to electrical energy, and electrolytic cells when being recharged by converting electrical energy to chemical energy.

As is well known, these battery cells can generate heat in use, thus reducing the range of the electric vehicle and the durability and overall life of the battery cells making up the rechargeable battery pack. In rare cases, a single battery cell can overheat to the point of a thermal runaway, which can then propagate to the other battery cells and greatly reduce the longevity or the ability of the remaining cells to hold charge for an extended period of time. In extreme circumstances, the propagation of heat from the cell experiencing a thermal runaway can lead to a thermal runaway of the entire battery pack, thus destroying the battery pack and potentially the electric vehicle.

Although various systems have been developed over the years to regulate the temperature of the battery pack, further improvements in the ability to mitigate propagation of the thermal event for the use in a battery pack of an electric vehicle, and to decrease the chance that an overheated cell will affect any adjacent cell and/or the entire battery pack is desirable. The present disclosure addresses these concerns.

SUMMARY OF THE DISCLOSURE

Embodiments of the present disclosure provide a prioritized flow of cooling thermal regulation fluid to one or more battery cells or modules likely experiencing a thermal event. In particular, embodiments of the present disclosure enable such a prioritized flow through the inherent material properties of a by material valve when exposed to thermal regulation fluid of a given temperature, and without the use of complex temperature sensors and electronic valves. Accordingly, embodiments of the present disclosure enable a prioritized cooling of a battery module in the early stages of a thermal runaway, even when safety electronics associated with the battery module have been destroyed or otherwise cease functioning.

One embodiment of the present disclosure provides an electric vehicle having a thermal regulation system configured to prioritize a flow of a thermal regulation fluid to one or more battery cells experiencing a thermal event through inherent material properties of a valve when exposed to the thermal regulation fluid of a given temperature, the electric vehicle including, a battery pack including a plurality of battery cells, and a thermal regulation system defining a plurality of conduits through which a flow of a thermal regulation fluid can flow, portions of the thermal regulation system positioned in close proximity to the at least one of the plurality of battery cells to provide cooling to said plurality of battery cells, wherein the thermal regulation system includes one or more bi-material valves configured to at least one of open or close in response to a change in temperature of the thermal regulation fluid, thereby rerouting a flow of the thermal regulation fluid to prioritize cooling to the one or more battery cells experiencing a thermal event.

In one embodiment, the electric vehicle comprises at least one of an all-electric vehicle, a plug-in hybrid vehicle, or a hybrid vehicle. In one embodiment, the plurality of battery cells are grouped into battery modules. In one embodiment, at least portions of the thermal regulation system are positioned adjacent to the battery modules to enable heat transfer between the battery modules and the thermal regulation system. In one embodiment, the thermoregulation system includes one or more cooling contact pads configured to correspond with one or more thermal transfer surfaces of the battery modules. In one embodiment, each of the one or more cooling contact pads includes an outlet configured to enable a flow of thermal transfer fluid out of the cooling contact pads, and wherein the bi-material valve is associated with the outlet, thereby enabling thermal regulation fluid heated above a threshold temperature to transition the bi-material valve from a closed position to an open position, or vice versa. In one embodiment, the thermal regulation system includes at least one inlet line configured to route a flow of thermal regulation fluid to the cooling pads, at least one return line configured to route flow of thermal regulation fluid away from the cooling pads, and at least one prioritized line configured to serve as an alternate flow path for routing a flow of thermal regulation fluid away from the cooling pads. In one embodiment, at least one of the one or more bi-material valves is positioned at a downstream location of the return line. In one embodiment, each of the one or more bi-material valves comprise one or more discs formed of a first material on one side or surface of the disc, and a second material on an opposing side or surface of the disc. In one embodiment, the first material has a higher coefficient of thermal expansion than the second material. In one embodiment, the bi-material valve is configured to transition from a closed position to an open position at a temperature of about 100° C. In one embodiment, the bi-material valve is configured to gradually transition from a closed position to an open position over a temperature range of about 60° to about 120° C.

Another embodiment of the present disclosure provides a battery thermal regulation system configured to prioritize a flow of cooling fluid past at least one of a battery cell experiencing a thermal event, including a plurality of conduits through which a flow of thermal regulation fluid can flow, portions of the thermal regulation system positioned in close proximity to the at least one of a plurality of battery cells to provide cooling to said plurality of battery cells, wherein the thermal regulation system includes one or more bi-material valves configured to at least one of open or close in response to a change in temperature of the thermal regulation fluid, thereby rerouting a flow of the thermal regulation fluid through the plurality of conduits to prioritize cooling to one or more battery cells experiencing a thermal event.

In one embodiment, the thermoregulation system includes one or more cooling contact pads configured to correspond with one or more thermal transfer surfaces of a battery pack. In one embodiment, each of the one or more cooling contact pads includes an outlet configured to enable a flow of thermal transfer fluid out of the cooling contact pads, and wherein at least one bi-material valve of the one or more bi-material valves is associated with the outlet, thereby enabling thermal regulation fluid heated above a threshold temperature to transition the at least one bi-material valve from a closed position to an open position, or vice versa. In one embodiment, the system further includes at least one inlet line configured to route a flow of thermal regulation fluid to the cooling pads, at least one return line configured to route flow of thermal regulation fluid away from the cooling pads, and at least one prioritized line configured to serve as an alternate flow path for routing a flow of thermal regulation fluid away from the cooling pads. In one embodiment, at least one bi-material valve of the one or more bi-material valves is positioned at a downstream location of the return line. In one embodiment, each of the one or more bi-material valves comprise one or more discs formed of a first material on one side or surface of the disc, and a second material on an opposing side or surface of the disc. In one embodiment, the first material has a higher coefficient of thermal expansion than the second material. In one embodiment, at least one bi-material valve of the one or more bi-material valves is configured to gradually transition from a closed position to an open position over a temperature range of about 60° to about 120° C.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
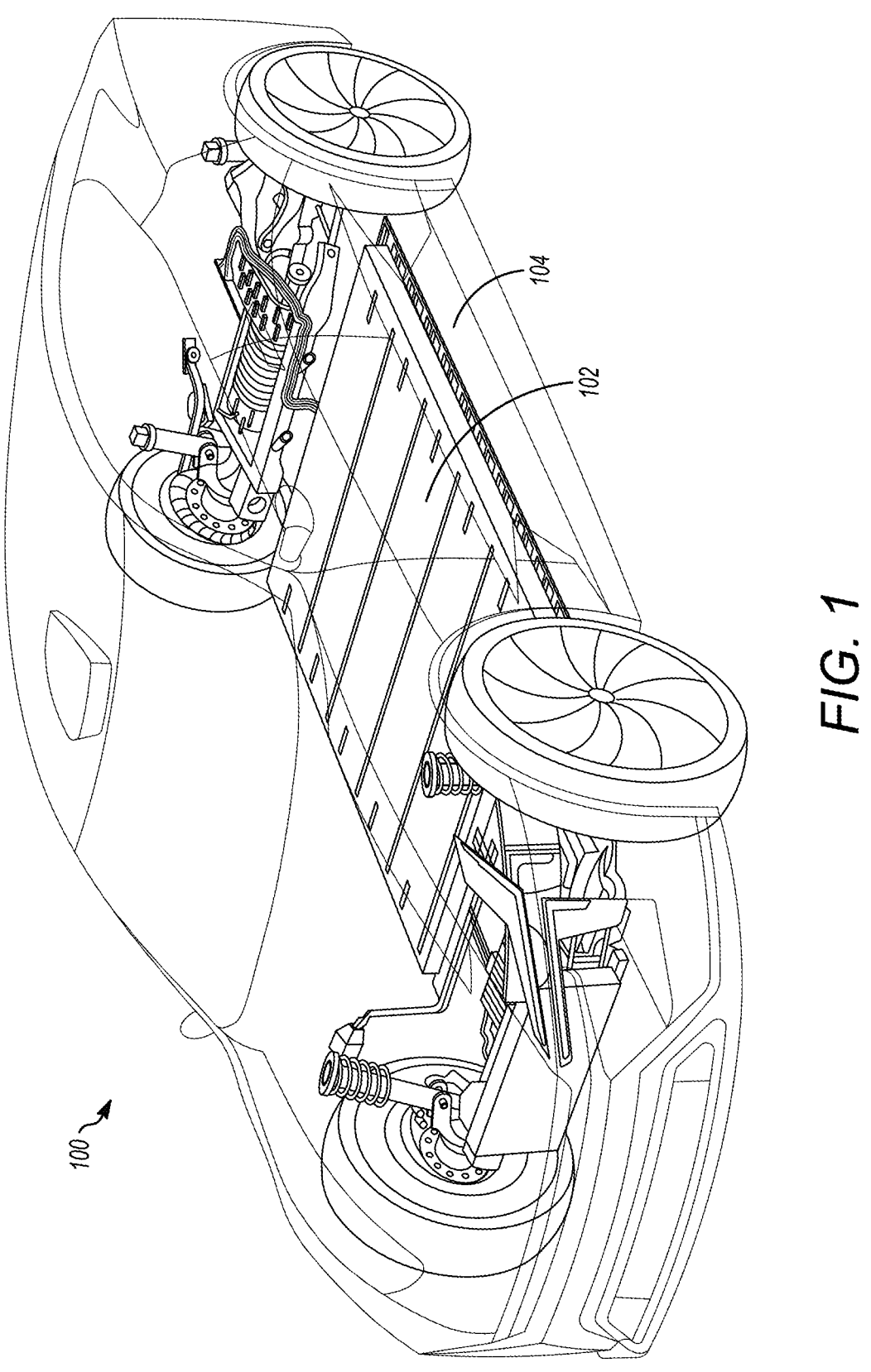
FIG. 1 is a perspective view depicting an electric vehicle including a battery pack including a thermal regulation system having one or more bi-material cooling valves configured to automatically provide rapid cooling to one or more battery cells or modules within the battery pack likely to be experiencing a thermal event, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an electric vehicle 100 comprising a battery pack 102 including a thermal regulation system having one or more bi-material cooling valves configured to automatically provide rapid cooling to one or more battery cells or modules within the battery pack experiencing a thermal event, is depicted in accordance with an embodiment of the disclosure. As depicted, the battery pack 102 can be in the form of a sealed battery cell compartment containing clusters of individual battery cells (sometimes referred to as "battery modules") and other battery related components. The assembled battery pack 102 can be mounted to the frame or chassis 104 of the vehicle 100 and in some embodiments can be positioned adjacent to a cabin floor of the vehicle 100, thereby maintaining a low center of gravity. For example, the battery pack 102 may be positioned below the passenger compartment, which is generally considered an ideal location as the battery pack 102 maintains a low center of gravity of the vehicle 100, and is spaced away from the outer body of the vehicle, and therefore less prone to being damaged in a collision.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower", etc. are generally described herein with reference to the drawings in the usual gravitational frame of reference, regardless of how the components may be oriented.

Additionally, the terms "battery," "cell," and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configurations. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 2:
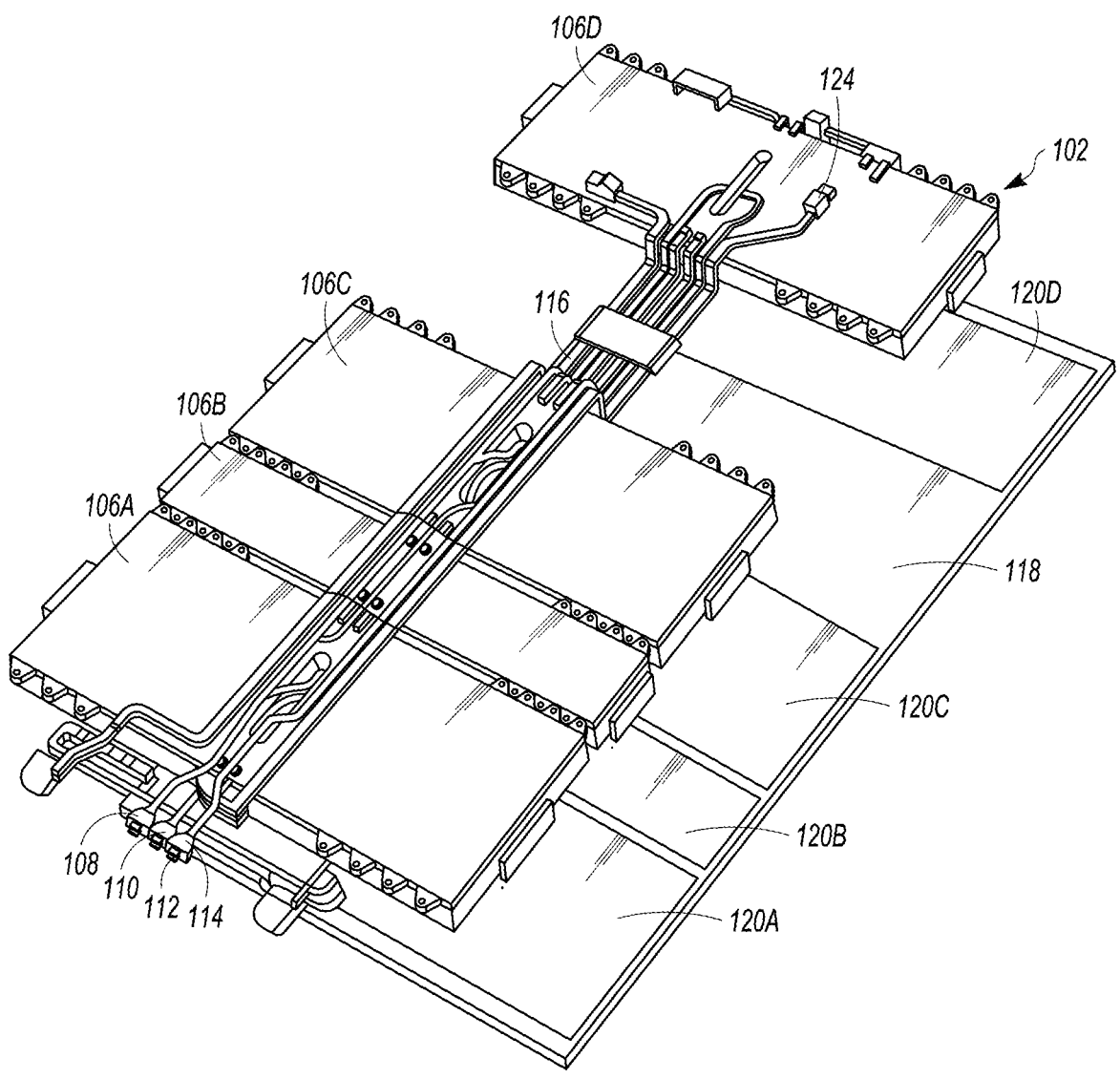
FIG. 2 is a partially exploded, perspective view depicting an electric vehicle battery pack including a thermal regulation system including one or more bi-material valves configured to reroute a flow of thermal regulation fluid to prioritize cooling to one or more battery cells or modules within the battery pack likely to be experiencing a thermal event, in accordance with an embodiment of the disclosure.

With additional reference to FIG. 2, a perspective view of an electric vehicle battery pack 102 comprising a thermal regulation system including one or more bi-material cooling valves configured to transition from an open to closed position (or closed to open position) upon being subjected to a temperature above (or below) a defined threshold, is depicted in accordance with an embodiment of the disclosure. In some embodiments, the battery pack 102 can include a rigid outer shell, sometimes referred to as a "battery tray," representing a bottom and one or more sides of a structural vessel defining a compartment. Further, in embodiments, the battery tray can include one or more structural supports, such as cross members, which can provide structural support to the battery pack 102, as well as surfaces within the compartment on which other components of the battery pack can be affixed.

As depicted, individual battery cells within the battery pack 102 can be grouped into distinct clusters 106A-D (sometimes referred to as "battery modules"). In addition to the battery modules 106A-D, a variety of components can be packed into the compartment before a cover is affixed to a top surface of the battery tray, thereby sealing the compartment. In some embodiments, the components can include an electrical current transmission system 108, safety system 110, battery management system 112 (including current management system 114), and a battery bus bar 116 interconnecting the various components 106A-F, 110, 112, and 114.

Figure 3:
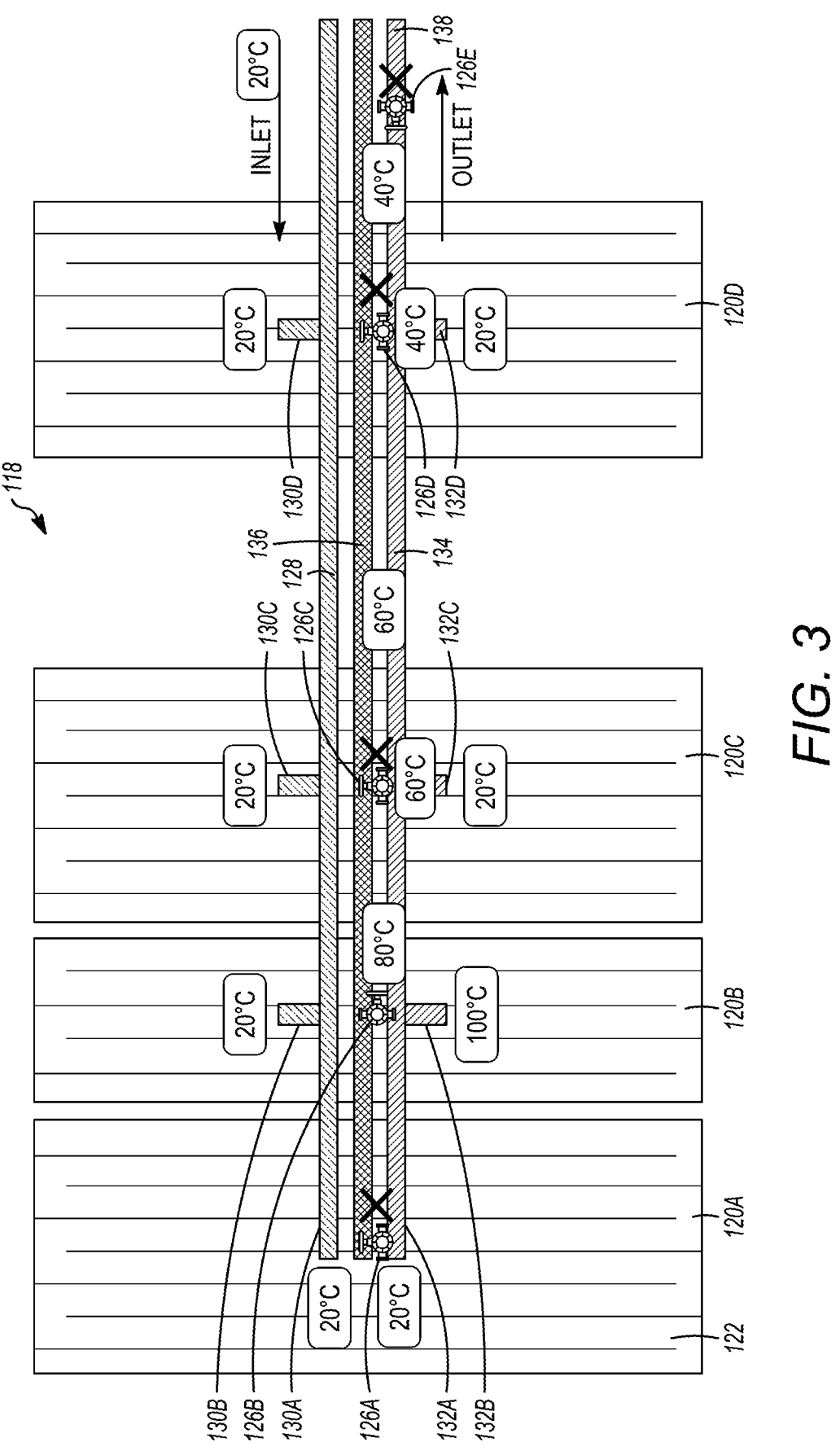
FIG. 3 is a schematic diagram depicting a thermal regulation system including a plurality of bi-material valves configured to enable various routings of thermal regulation fluid in an effort to prioritize cooling of one or more cooling pads associated with overheating battery cells or modules, in accordance with an embodiment of the disclosure.

A thermal regulation system 118 can be positioned adjacent to the battery modules 106A-D to affect thermal regulation of the battery modules 106A-D. For improved efficiency, rather than heating or cooling the entire exterior of the thermal regulation system 118, in some embodiments, the thermal regulation system 118 can include one or more cooling contact pads 120A-D (also depicted in FIG. 3) configured to correspond with one or more thermal transfer surfaces of the battery modules 106A-D, battery busbar 116 or other components of the battery pack 102. To affect active heating or cooling, in some embodiments, the thermal regulation member can define one or more conduits 122 (as depicted in FIG. 3) to which a thermal regulation fluid or medium can flow. In some embodiments, the thermal regulation system 118 can be positioned adjacent to a bottom surface of the battery modules 106A-D. Other configurations of the thermal regulation system 118 are also contemplated. Once the various components of the battery pack 102 have been positioned within the compartment, a cover can be affixed to the top surface via a plurality of fasteners, adhesive, or a combination thereof.

In some embodiments, the battery management system 112 or other components of the multi-cell battery pack can include one or more sensors 124 for monitoring a physical state of the individual cells during operation. Such sensors 124 include, but are not limited to measurement of temperature, pressure, voltage, amperage, and other ambient conditions (e.g., the presence of smoke or fumes, the presence of liquid, etc.) within the battery pack 102. Data from the sensors 124 can then be used by hardware and software to make intelligent decisions to control a characteristic of the individual cells, so that the characteristic within any individual cell stays within an acceptable operating range. Additionally, the battery management system 112, sometimes in combination with the other systems (e.g., electrical current transmission system 108, safety system 110, or battery management system 112) can be configured to enable information gathered by the one or more sensors 122 to flow into and out of the battery pack 102. The battery management system 124 can include mixed signal integrated circuits that incorporate both analog and digital circuits, such as one or more types of digital memory and special registers to hold battery data.

During vehicle operation the individual battery cells discharge energy as galvanic cells by converting chemical energy to electrical energy (e.g., for use by the electric motor). During high rates of discharge (e.g., when the vehicle is under heavy acceleration and/or driving up a hill, etc.), the individual cells can generate a significant amount of heat. The heat produced by a high rate of discharge within an individual cell is generally a function of an electrical current and an internal electrical resistance of the cell. The cells are generally more sensitive to high temperatures when a voltage within the cell is relatively high. This volatility is dependent upon cell chemistry (e.g., lithium-ion reaction, etc.) and varies among different types of cells contemplated for use. It has been observed that optimal battery cell performance is more likely to occur within a desired temperature range (e.g., 40-45° C., etc.), with a maximum/not to exceed temperature (e.g., 60° C.) being above the desired temperature range. In rare cases, individual battery cells within a battery pack 102 can exhibit thermal characteristics above a desired temperature range (e.g., above the maximum/not to exceed temperature), which may result in a failure (e.g., thermal runaway, etc.) of the individual cell. During such an occurrence, heat energy from the cell exhibiting the thermal characteristics can propagate into nearby and adjacent cells, thereby creating the potential for a chain reaction thermal event across multiple battery cells. For example, self-ignition of a battery cell may occur when the temperature of the cell reaches a temperature in a range of between about 120° C. and about 150° C.

To inhibit such a chain reaction thermal event, individual cells experiencing a thermal event (e.g., an over temperature condition) can be rapidly cooled within the battery pack 102, significantly slowing the chemical reaction taking place within the individual cell or cells experiencing the thermal event with a goal of inhibiting a larger order thermal runaway into adjacent cells, which may be positioned either radially, axially or nearby. For example, with additional reference to FIG. 3, a thermal regulation system 118 including one or more bi-material cooling valves 126A-E can be configured to prioritize the cooling effects associated with one or more cooling contact pads 120A-D corresponding to one or more cells or modules 106A-D experiencing thermal event.

In some embodiments, the thermal regulation system 118 can include an inlet conduit 128 configured to enable a flow of a thermal regulation fluid into a corresponding conduit 122 of the one or more of the contact pads 120A-D. For example, as depicted, in one embodiment, the thermal regulation system 118 can include a total of four cooling contact pads 120A-D; although other quantities and configurations of cooling contact pads are also contemplated. Accordingly, the thermal regulation fluid can flow into the one or more contact pads 120A-D via a corresponding plurality of inlets 130A-D. In some embodiments, a temperature of the thermal regulation fluid can be monitored (e.g., via sensor 124) upon flowing through the inlet 130A-D. As depicted in FIG. 3, the monitored temperature at each of the inlets 130A-D is approximately 20° C., thereby indicating normal thermal regulation fluid inlet temperature conditions.

Once the thermal regulation fluid passes through the conduit 122 (to provide a cooling effect to the associated battery module 106A-D) the thermal regulation fluid can flow through an outlet 132A-D for potential transfer out of the battery pack 102 via a return or outlet line 134. In some embodiments, a temperature of the thermal regulation fluid can be monitored (e.g., via sensor 124) upon flowing through the outlets 132A-D.

Under normal conditions, it would be expected that the thermal regulation fluid exiting the cooling contact pads 120A-D through the corresponding outlets 132A-D may vary in temperature with respect to the temperatures measured at the inlets 130A-D. For example, if the thermal regulation fluid is used for cooling purposes, it would be expected that the thermal regulation fluid exiting through the outlets 132A-D would have a higher temperature than that sensed at the inlets 130A-D. Conversely, if the thermal regulation fluid is used for heating purposes, it would be expected that the thermal regulation fluid exiting to the outlets 132A-D would have a lower temperature than that sensed at the inlets 130A-D. In a balanced environment, the sensed temperatures of the thermal regulation fluid at the inlet 130A-D and outlet 132A-D can be substantially identical.

Under abnormal conditions, there may be a large difference between the sensed temperature at the outlet 132A-D and the sensed temperature at the inlet 130A-D. For example, as depicted in FIG. 3, the monitored temperature of the thermal regulation fluid flowing out of cooling contact pads 120A, 120C and 120D is approximately 20° C., while the temperature of the thermal regulation fluid flowing out of cooling contact pad 120B is approximately 100° C., while the temperature of the thermal regulation fluid flowing through the inlets 130A-D is approximately 20° C., thereby indicating that at least one of the cells within the corresponding battery module (e.g., battery module 106B) may be experiencing a thermal event.

In such an event, one or more of the bi-material valves 126A-E can actuate or otherwise change position to accommodate a prioritized or expedited flow of thermal regulation fluid through the cooling contact pad associated with the battery module experiencing the thermal event. For example, as depicted in FIG. 3, the bi-material valve 126B associated with the high outlet temperature can transition from a closed position to an open or flow position, thereby enabling the thermal regulation fluid flowing through the outlet 132B to flow directly into a prioritized outlet line 136. Thereafter, the thermal regulation fluid flowing through the prioritized line 136 can potentially be routed out of the battery pack 102 (e.g., into a cooling radiator, pump, etc.), then rerouted through inlet line 128 and back into the one or more cooling contact pads 120A-D via inlets 130A-D.

To inhibit a flow of thermal regulation fluid through cooling contact pads 120A-D not experiencing a thermal event, a bi-material valve 126E positioned at a downstream position 138 of a return or outlet line 134 can be configured to transition from an open or flow position to a closed position, thereby ceasing a flow of the thermal regulation fluid out cooling contact pads 120A, 120C, 120D. The thermal regulation fluid, however, continues to flow through the cooling contact pad 120B associated with the thermal event, as the bi-material valve 126B associated with that cooling contact pad 120B remains in the open or flow position, thereby enabling the thermal regulation fluid to enter the prioritized outlet line. A pressure buildup caused by a closing of the bi-material valve 126E positioned at the downstream position 138 of the outlet line 134, eventually inhibits thermal regulation fluid from entering the cooling contact pads 120A, 120C and 120D via the inlets 130A, 130C and 130D, so as to prioritize thermal regulation fluid flowing into the cooling contact pad 120B associated with the thermal event.

In embodiments, the bi-material valves 126A-E can be calibrated to transition from an open or flow position to a closed position or vice versa at various determined temperatures. For example, as depicted in FIG. 3, each of the bi-material valves 126A-D associated with the respective outlets 132A-D of the cooling contact pads 120A-D can be configured to transition from a closed position to an open or flow position at a temperature of about 100° C.; although transitions at other temperatures between about 60° and about 120° C. is also contemplated.

As it is anticipated that high temperature thermal regulation fluid flowing out of a cooling contact pad 120B associated with a thermal event will generally cool as it flows through the outlet line 134 (e.g., depicted as entering at 100°, cooling to 60° along the outlet line 134, and reaching the downstream position 138 at approximately 40° C.) it is anticipated that the established transition temperature of the downstream position bi-material valve 126E will be less than the transition temperature of the bi-material valves 126A-D associated with each of the respective outlets 132A-D of the cooling contact pads 120A-D. For example, the bi-material valve 126E positioned at the downstream position 138 of the outlet line 134 can be configured to transition from an open or flow position to a closed position at about 40° C.; although transitions at other temperatures between about 30° and about 100° C. is also contemplated.

Figure 4A:
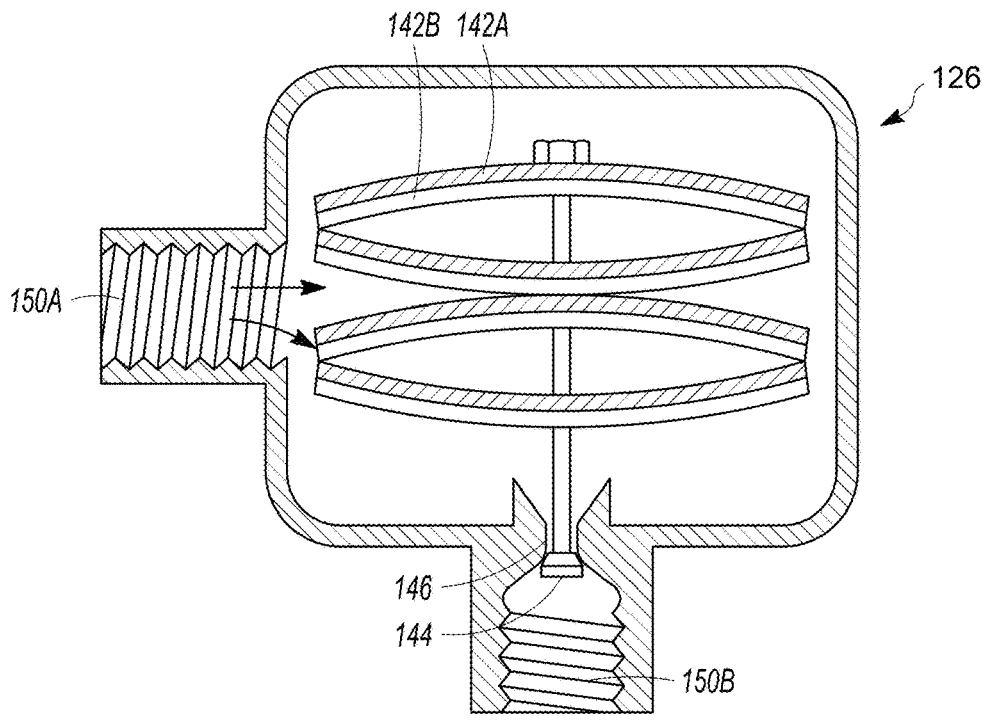
FIG. 4A is a cross-sectional view of a bi-material valve configured to transition between a sealed or closed position and an open or flow position, wherein the bi-material valve is depicted in the closed position, in accordance with an embodiment of the disclosure.
Figure 4B:
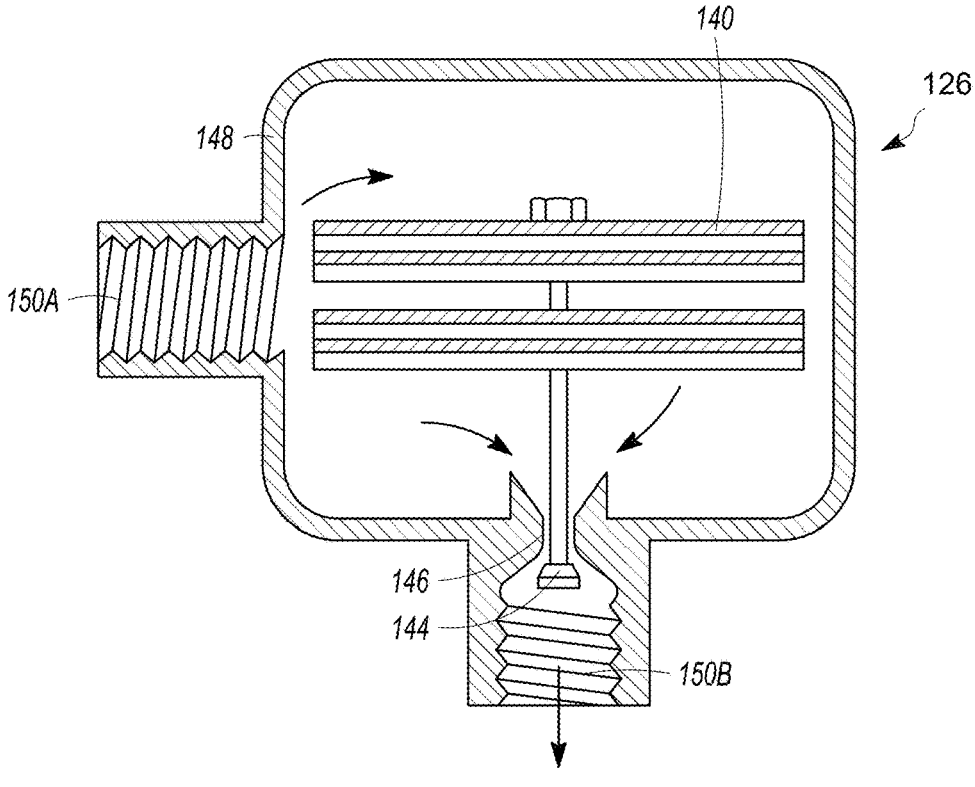
FIG. 4B is a cross-sectional view of the bi-material valve of FIG. 4A in the open or flow position, in accordance with an embodiment of the disclosure.

Referring to FIGS. 4A-B, a bi-material valve 126 calibrated to transition from a closed position (as depicted in FIG. 4A) to an open or flow position (as depicted in FIG. 4B) or vice versa at a determined temperature or range of temperatures, is depicted in accordance with an embodiment of the disclosure. As depicted, in some embodiments, the bi-material valve 126 can define a valve body 148 defining an inlet 150A and an outlet 150B, the valve body 148 housing one or more discs 140 configured to change shape in response to a corresponding change in temperature. For example, as depicted in FIGS. 4A-B, in one embodiment, the bi-material valve 126 can include a total of four discs 140 operably coupled to a valve seat 144 positioned within a defined valve passage 146, such that deformation of the discs 140 causes movement of the valve seat 144 relative to the valve passage 146; although the use of other quantities of discs 140 is also contemplated.

In embodiments, each disc 140 can be formed of a first material 142A on one side or surface of the disc 140, and a second material 142B on an opposing side or surface of the disc 140. In embodiments, the first material 142A can have a different coefficient of thermal expansion than the second material 142B, such that an increase in temperature above a defined threshold experienced by the disc 140 causes the first material 142A to expand at a larger magnitude/faster rate than the second material 142B, thereby transitioning the disc 140 from a closed position to an open or flow position, thereby enabling a passage of thermal regulation fluid therethrough. Conversely, when the temperature experienced by the disc 140 decreases below the defined threshold, the first material 142A can contract in size relatively more than the second material 142B, thereby transitioning the disc 140 from the open or flow position, back to the closed position.

In embodiments, the first and second materials 142A-B can be of a variety of metals, alloys, polymers, composites, or the like, provided that the first material 142A has a relatively larger coefficient of thermal expansion (e.g., expands and contracts more over a given temperature range) than the second material 142B. Accordingly, in embodiments, the first and second materials 142A-B can be tuned to cause the bi-material valve 126 to selectively transition from a sealed position to a flow position (or vice versa) at a desired threshold temperature or range of temperatures. For example, in one embodiment, the bi-material valve 126 can be configured to transition from the sealed, closed position to the open or flow position at about 100° C. In other embodiments, the valve or port can be configured to gradually transition in a range of between about 60° and about 120° C., thereby gradually increasing a prioritized flow of thermal regulation fluid through a cooling contact pad 120 as the fluid within that pad generally increases in temperature, although other ranges of triggering or threshold temperatures are also contemplated.

Accordingly, embodiments of the present disclosure enable a prioritized flow of cooling thermal regulation fluid through cooling contact pads 120 associated with battery cells or modules 106 likely experiencing a thermal event. Moreover, embodiments of the present disclosure enable such a prioritized flow through the inherent material properties of the valve when exposed to thermal regulation fluid of a given temperature, and without the use of complex temperature sensors and electronic valves. Accordingly, embodiments of the present disclosure enable a prioritized cooling of a battery module in the early stages of a thermal runaway, even when safety electronics associated with the battery module have been destroyed or otherwise cease functioning.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 106 (f) are not to be invoked unless the specific terms "means for" or "step for" are recited in a claim.

What is claimed is:

1. An electric vehicle having a thermal regulation system configured to prioritize a flow of a thermal regulation fluid to one or more battery cells experiencing a thermal event through a valve when exposed to the thermal regulation fluid of a given temperature, the electric vehicle comprising:
   a battery pack including a plurality of battery cells; and
   the thermal regulation system defining a plurality of conduits through which the flow of the thermal regulation fluid can flow, portions of the thermal regulation system positioned in proximity to at least one of the plurality of battery cells to provide cooling to said plurality of battery cells, wherein the thermal regulation system includes one or more bi-material valves configured to at least one of open or close in response to a change in temperature of the thermal regulation fluid, thereby rerouting the flow of the thermal regulation fluid to prioritize cooling to the one or more battery cells experiencing the thermal event, wherein:
   the plurality of battery cells are grouped into battery modules;
   the thermoregulation system includes one or more cooling contact pads configured to correspond with one or more thermal transfer surfaces of the battery modules; and
   the thermal regulation system includes at least one inlet line configured to route the flow of the thermal regulation fluid to the one or more cooling contact pads, at least one return line configured to route the flow of the thermal regulation fluid away from the one or more cooling contact pads, and at least one prioritized line configured to serve as an alternate flow path for routing the flow of the thermal regulation fluid away from the one or more cooling contact pads.

2. The electric vehicle of claim 1, wherein the electric vehicle comprises at least one of an all-electric vehicle, a plug-in hybrid vehicle, or a hybrid vehicle.

3. The electric vehicle of claim 1, wherein at least portions of the thermal regulation system are positioned adjacent to the battery modules to enable heat transfer between the battery modules and the thermal regulation system.

4. The electric vehicle of claim 1, wherein each of the one or more cooling contact pads includes an outlet configured to enable the flow of the thermal regulation fluid out of the one or more cooling contact pads, and wherein at least one bi-material valve of the one or more bi-material valves is associated with the outlet, thereby enabling thermal regulation fluid heated above a threshold temperature to transition the at least one bi-material valve from a closed position to an open position, or vice versa.

5. The electric vehicle of claim 1, wherein a bi-material valve of the one or more bi-material valves is positioned at a downstream location of the return line.

6. The electric vehicle of claim 1, wherein each of the one or more bi-material valves comprises one or more discs formed of a first material on one side or surface of the disc, and a second material on an opposing side or surface of the disc.

7. The electric vehicle of claim 6, wherein the first material has a higher coefficient of thermal expansion than the second material.

8. The electric vehicle of claim 6, wherein the bi-material valve is configured to transition from a closed position to an open position at a temperature of about 100° C.

9. The electric vehicle of claim 6, wherein at least one bi-material valve of the one or more bi-material valves is configured to gradually transition from a closed position to an open position over a temperature range of about 60° C. to about 120° C.

\* \* \* \* \*